United States Patent
MacDonald et al.

(10) Patent No.: US 7,606,363 B1
(45) Date of Patent: Oct. 20, 2009

(54) SYSTEM AND METHOD FOR CONTEXT SWITCHING OF A CRYPTOGRAPHIC ENGINE

(75) Inventors: Timothy I. MacDonald, Toddville, IA (US); Jason A. Silcox, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 867 days.

(21) Appl. No.: 11/189,251

(22) Filed: Jul. 26, 2005

(51) Int. Cl.
*H04K 1/00* (2006.01)

(52) U.S. Cl. .......................... 380/29; 455/72; 370/202; 370/521; 713/150; 713/168; 713/174; 713/186

(58) Field of Classification Search ................. 718/107, 718/108; 380/29
See application file for complete search history.

(56) References Cited

U.S. PATENT DOCUMENTS

| | | | |
|---|---|---|---|
| 5,685,008 A * | 11/1997 | Pan et al. ........................ 712/17 |
| 6,081,895 A * | 6/2000 | Harrison et al. ............. 713/189 |
| 6,233,668 B1 | 5/2001 | Harvey et al. ................ 711/206 |
| 6,272,517 B1 | 8/2001 | Yue et al. ..................... 709/102 |
| 6,298,119 B1 | 10/2001 | Shaffer et al. ............ 379/29.07 |
| 6,304,189 B1 | 10/2001 | Koch et al. ................... 340/664 |
| 6,314,510 B1 | 11/2001 | Saulsbury et al. ........... 712/213 |
| 6,327,650 B1 | 12/2001 | Bapst et al. .................. 712/228 |
| 6,330,626 B1 * | 12/2001 | Dennin et al. .................. 710/52 |
| 6,367,005 B1 | 4/2002 | Zahir et al. .................. 712/228 |
| 6,374,286 B1 | 4/2002 | Gee et al. ..................... 709/108 |
| 6,393,581 B1 | 5/2002 | Friedman et al. ................ 714/4 |
| 6,401,138 B1 | 6/2002 | Judge et al. .................. 709/328 |
| 6,401,149 B1 | 6/2002 | Dennin et al. ................. 710/58 |
| 6,407,752 B1 | 6/2002 | Harnett ....................... 345/744 |
| 6,408,325 B1 | 6/2002 | Shaylor ....................... 709/108 |
| 6,437,788 B1 | 8/2002 | Milot et al. .................. 345/552 |
| 6,483,907 B1 | 11/2002 | Wong et al. ............. 379/112.01 |
| 6,496,847 B1 | 12/2002 | Bugnion et al. ................. 709/1 |
| 6,510,508 B1 | 1/2003 | Zuraski, Jr. et al. ......... 711/207 |
| 6,519,265 B1 | 2/2003 | Liu et al. ..................... 370/463 |
| 6,526,362 B2 | 2/2003 | Jones et al. ................... 702/82 |
| 6,546,443 B1 | 4/2003 | Kakivaya et al. ............ 710/200 |
| 6,553,427 B1 | 4/2003 | Chang et al. ................ 709/314 |
| 6,553,486 B1 | 4/2003 | Ansari ........................ 712/222 |
| 6,553,487 B1 | 4/2003 | Sukonik et al. ............. 712/228 |
| 6,556,570 B1 | 4/2003 | Delattre et al. ......... 370/395.31 |
| 6,574,624 B1 | 6/2003 | Johnson et al. ................. 707/5 |
| 6,599,442 B2 | 7/2003 | Green ................... 252/299.01 |
| 6,604,187 B1 | 8/2003 | McGrath et al. ............ 711/209 |
| 6,606,687 B1 | 8/2003 | Chauvel et al. ............. 711/133 |
| 6,618,722 B1 | 9/2003 | Johnson et al. ................. 707/5 |

(Continued)

*Primary Examiner*—Taghi T. Arani
*Assistant Examiner*—Mahfuzur Rahman
(74) *Attorney, Agent, or Firm*—Daniel M. Barbieri (57) ABSTRACT

A cryptographic system, method, and device for implementing cryptographic functions designed to protect data is provided. The method includes (a) providing an algorithm processing unit, (b) executing a cryptographic algorithm at the algorithm processing unit using a first cryptographic datum and input data to form output data, (c) determining if a context switch command is received from a controller, (d) receiving a second cryptographic datum from a memory if the context switch command is received, (e) replacing the second cryptographic datum with the first cryptographic datum if the context switch command is received, and (f) repeating (b)-(e). The controller switches the processing state of the algorithm processing unit from one channel to another channel without leaking data between channels through execution of the operations each time a channel switch is selected. As a result, a single algorithm processing unit used with a controller can provide multiple independent levels of security.

19 Claims, 3 Drawing Sheets

U.S. PATENT DOCUMENTS

| | | | |
|---|---|---|---|
| 6,647,456 B1 | 11/2003 | Van Dyke et al. | 711/105 |
| 6,667,988 B1 | 12/2003 | Liu et al. | 370/463 |
| 6,671,762 B1 | 12/2003 | Soni et al. | 710/267 |
| 6,674,841 B1 | 1/2004 | Johns et al. | 379/67.1 |
| 6,684,280 B2 | 1/2004 | Chauvel et al. | 710/244 |
| 6,697,468 B2 | 2/2004 | Wong et al. | 379/112.01 |
| 6,701,491 B1 | 3/2004 | Yang | 716/4 |
| 6,718,214 B1 | 4/2004 | Schoettle et al. | 700/28 |
| 6,751,737 B1 | 6/2004 | Russell et al. | 713/200 |
| 6,772,326 B2 | 8/2004 | Chauvel et al. | 712/244 |
| 6,775,293 B1 | 8/2004 | Robotham et al. | 370/412 |
| 6,823,024 B2 | 11/2004 | Wagner | 375/319 |
| 6,829,766 B1 | 12/2004 | Murata | 718/108 |
| 6,845,238 B1 | 1/2005 | Müller | 455/436 |
| 6,845,501 B2 | 1/2005 | Thompson et al. | 717/140 |
| 6,854,299 B2 | 2/2005 | Weinmann et al. | 68/12.02 |
| 6,868,490 B1 | 3/2005 | Barry et al. | 712/15 |
| 6,883,171 B1 | 4/2005 | Bittner, Jr. et al. | 718/108 |
| 6,886,165 B1 | 4/2005 | Müller et al. | 719/310 |
| 6,889,310 B2 | 5/2005 | Cismas | 712/201 |
| 6,895,506 B1 | 5/2005 | Abu-Husein | 713/193 |
| 2003/0051124 A1* | 3/2003 | Dowling | 712/244 |

* cited by examiner

SYSTEM AND METHOD FOR CONTEXT SWITCHING OF A CRYPTOGRAPHIC ENGINE

FIELD OF THE INVENTION

The subject of the disclosure relates generally to the field of multi-channel radio systems. More specifically, the subject of the disclosure relates generally to a system and a method for context switching a cryptographic engine used to support multiple radio channels while also supporting multiple independent levels of security.

BACKGROUND

A context switch is the switching of a processing unit from one process or thread to another. A process is an executing instance of a program. A context is the contents of a processing unit's registers and program counter at any point in time. A register is a small amount of very fast memory inside the processing unit as opposed to the slower random access memory, or even slower read only memory, outside the processing unit. Context switching involves: 1) suspending the progression of one process and storing the context or state for that process in a memory, 2) retrieving the context of the next process from the memory and restoring it in the processing unit's registers, and 3) returning to the location indicated by the program counter to resume the process. A component is a process or a hardware device that transmits and/or receives information from another process and/or hardware device.

Security requires that non-secure resources cannot access secure data. An architecture supporting multiple independent levels of security (MILS) provides a hierarchy of security services, where each level uses the security services of a lower level to provide new security functionality. Each level is responsible only for its own security domain. A secure multilevel system (MLS) is one in which the system provides mechanisms to enforce mandated controls on the flow of information between components executing at different security levels. A system that supports MLS security tags objects with a classification level, tags processes with a clearance, and ensures that the data is manipulated by the processes according to the security policy.

A conventional transceiver system for a radio may comprise numerous processing subsystems for each channel. For example, a transceiver unit may contain a digital signal processing subsystem, a black processing subsystem, a cryptographic subsystem, a red processing subsystem, etc. for each channel. Traditional cryptographic systems dedicate a programmable algorithm processing unit (PAPU) to each physical channel within a device to control the separation between the information flows. When very large radio systems are considered, such as those having in excess of 30-40 (or more) channels, this redundant capability becomes expensive in terms of cost, weight, and volume. What is needed, therefore, is a system and a method that utilize a different interconnect methodology and structure to reduce the number of PAPUs, thereby providing cost, size, and/or weight savings while maintaining a fast response time. Further, there is a need for a system and a method that provides cost, size, and/or weight savings while supporting MILS.

SUMMARY

A particular example of the invention provides a cryptographic system that implements cryptographic functions designed to protect data. Traditional cryptographic systems dedicate a PAPU to each physical channel within the system. Thus, these types of systems attain MLS through hardware separation. Using a context switch controller, however, a single PAPU can process many channels of dissimilar data (classification or otherwise). The context switch controller switches the processing state of the PAPU from one channel to another channel without leaking data between channels through execution of a rigid sequence of operations executed each time a channel switch is selected. As a result, a single PAPU used with a context switch controller can be deemed MILS compliant.

An exemplary embodiment of the invention relates to a cryptographic system that implements cryptographic functions designed to protect data. The cryptographic system includes, but is not limited to a memory, an algorithm processing unit, and a context switch controller. The memory stores a first cryptographic datum. The algorithm processing unit (a) executes a cryptographic algorithm using a second cryptographic datum to form output data, (b) determines if a context switch command is received, (c) receives the first cryptographic datum from the memory if the context switch command is received, (d) replaces the second cryptographic datum with the first cryptographic datum if the context switch command is received, and (e) repeats (a)-(d). The context switch command includes a request to change a processing state of the algorithm processing unit. The context switch controller sends the context switch command to the algorithm processing unit.

Another exemplary embodiment of the invention includes a device that uses the cryptographic system to protect data. Yet another exemplary embodiment of the invention includes a method of implementing the cryptographic functions. The method includes, but is not limited to, (a) providing an algorithm processing unit, (b) executing a cryptographic algorithm at the algorithm processing unit using a first cryptographic datum and input data to form output data, (c) determining if a context switch command is received from a controller, (d) receiving a second cryptographic datum from a memory if the context switch command is received, (e) replacing the second cryptographic datum with the first cryptographic datum if the context switch command is received, and (f) repeating (b)-(e). The input data is received from a component that may be implemented in hardware, software, firmware, or using any combination of these methods. For example, the component is a modem, a platform interface, a telecommunications application, and a computer application, etc. The context switch command includes a request to change a processing state of the algorithm processing unit.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
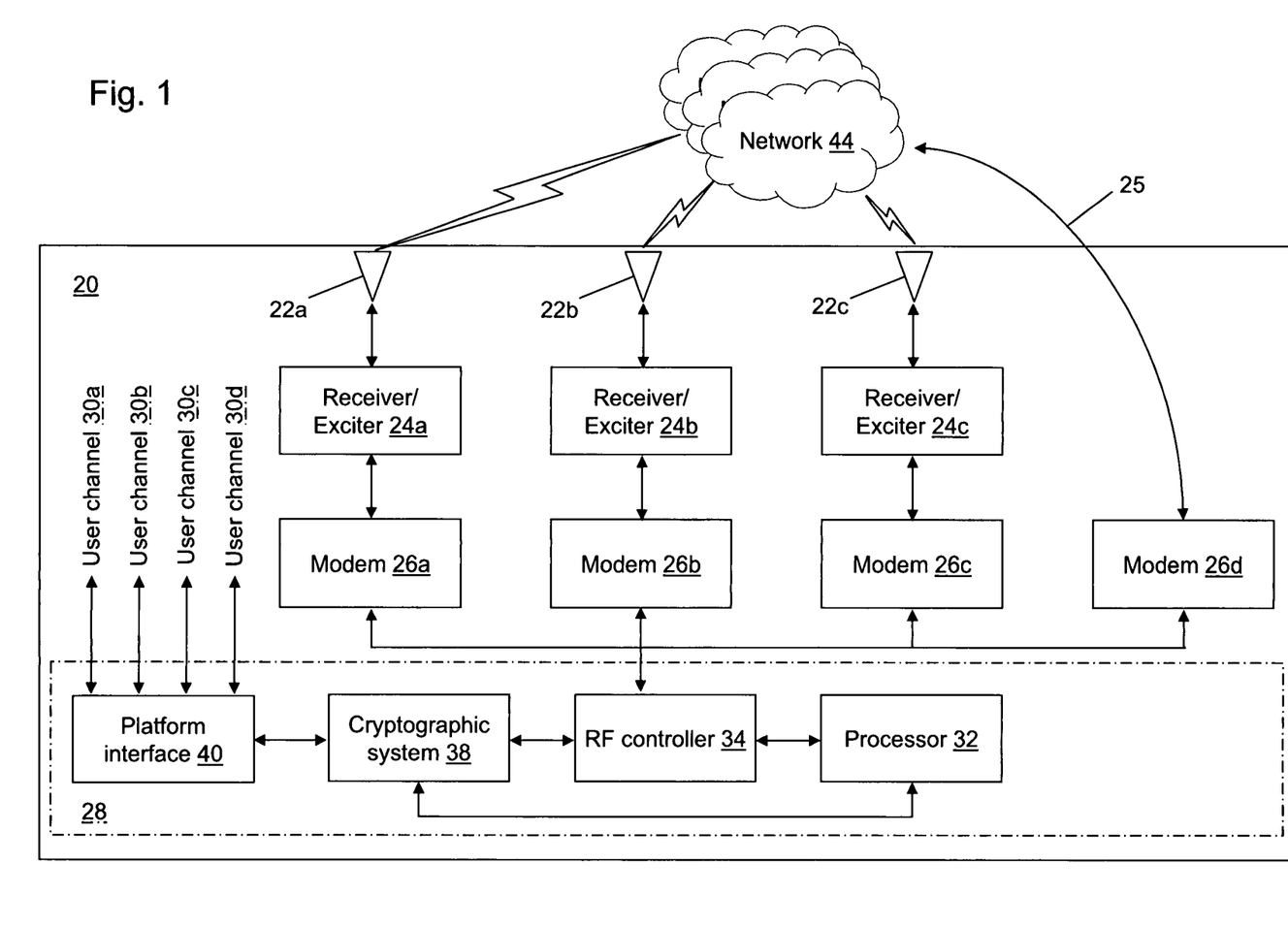
FIG. 1 is a block diagram of an exemplary device utilizing a cryptographic system in accordance with an exemplary embodiment of the present invention.

With reference to FIG. 1, a device 20 in accordance with an exemplary embodiment is shown. In the exemplary embodiment, device 20 includes, but is not limited to, a plurality of transceiver antennas 22a-22c, a receiver/exciter 24 for each of the plurality of transceiver antennas 22a-22c, a modem 26 for each of the plurality of transceiver antennas 22a-22c, a modem 26d, a networking/information security (INFOSEC) functional unit (NIU) 28, and a plurality of user channels 30a-30d. The device 20 need not be a communication device. For example, the device 20 may be a computer of any form factor. In the exemplary embodiment, device 20 may provide communication capabilities across the entire communication spectrum or across only a portion of the spectrum. In operation, a wireless communication signal is received by one of the plurality of transceiver antennas 22a-22c and processed through the corresponding receiver/exciter 24a-24c whereby the received signal is filtered from a transmission radio frequency (RF) to an intermediate frequency (IF) and possibly converted from an analog signal to a digital signal. The processed signal is demodulated by the respective modem 26a-26d before processing through NIU 28 and sending onto the appropriate user channel 30a-30d. Similarly, in a reverse procedure, data from one of the plurality of user channels 30a-30d is received by NIU 28, is modulated by one of the modems 26a-26c, and is sent to a corresponding receiver/exciter 24a-24c for transmission by one of the transceiver antennas 22a-22c over network 44.

Devices in a network are connected by communication paths that may be wired or wireless. Device 20 may connect with a plurality of networks 44. Device 20 includes a wired connection 25 that connects to modem 26d. The plurality of networks 44 may include both wired and wireless devices, such as satellites, cellular antennas, radios, etc. Thus, device 20 may communicate with other devices through both wired and wireless connections. The plurality of networks 44 additionally may interconnect with other networks and contain sub-networks. A network can be characterized by the type of transmission technology used. Device 20 may support communication using transmission technologies known by those skilled in the art both now and in the future.

In an alternative embodiment, device 20 may include separate transmit and receive antennas. Also, as known to those skilled in the art, a modem can process signals from more than one receiver/exciter 24a-24c and/or more than one wired connection. As a result, there may be fewer or additional modems 26a-26d. Additional components may be utilized by communication device 20. For example, device 20 includes one or more power source that may be a battery. Additionally, device 20 may include power amplifiers, filters, and other RF devices, for example, to perform antenna switching and/or cosite mitigation.

NIU 28 provides a host of functions that configure and control the flow of radio traffic between the modems 26a-26d and the user channels 30a-30d. The user channels 30a-30d may support red applications and/or black applications. A red application utilizes security controlled information such as the received signal or other information accessible by communication device 20; whereas black applications do not utilize security controlled information. NIU 28 also enforces a security policy associated with the flow of information between the modems 26a-26d and the user channels 30a-30d.

In an exemplary embodiment, NIU 28 includes, but is not limited to, a processor 32, an RF controller 34, a cryptographic system 38, and a platform interface 40.

Processor 32 executes instructions that may be written using one or more programming language, scripting language, assembly language, etc. The instructions may be carried out by a special purpose computer, logic circuits, or hardware circuits. Thus, processor 32 may be implemented in hardware, firmware, software, or any combination of these methods. The term "execution" is the process of running an application or the carrying out of the operation called for by an instruction. Device 20 may have one or more processor 32 that use the same or a different processing technology to execute instructions.

RF controller 34 controls the flow of information between the plurality of modems 26a-26d and the plurality of user channels 30a-30d and maintains the MILS. RF controller 34 may be implemented in hardware, firmware, software, or any combination of these methods. Cryptographic system 38 implements cryptographic functions associated with encryption/decryption of input data received from one of the user channels 30a-30d or received from one of the modems 26a-26d. Platform interface 40 provides the interface with the user channels 30a-30d.

In general, cryptography is used to protect data while it is being communicated between two points or while it is stored in a medium vulnerable to physical theft. Communication security provides protection of data by enciphering it at the transmitting point and deciphering it at the receiving point. The transmitting and the receiving points may be located within the same or different devices. The key must be available at the transmitter and receiver simultaneously during communication. The algorithms may be implemented in software, firmware, hardware, or any combination thereof. A cryptographic system includes a cryptographic engine, keying information, and operational procedures for their secure use. A cryptographic engine implements cryptographic functions.

Cryptographic systems may be utilized in various computer and telecommunication applications including data storage, access control and personal identification, network communications, radio, facsimile, e-mail and other electronic messaging systems, audio/video/voice transmission, etc. The cryptographic system 38 may be implemented in hardware, software, and/or firmware. The cryptographic system 38 performs security functions, including execution of cryptographic algorithms and key generation in support of the cryptographic algorithms. Key establishment may be performed using either electronic methods (a key loading device such as a smart card/token, PC card, or other electronic key loading device), manual methods (using a keyboard), or a combination of electronic and manual methods. Cryptographic keys can be stored in either plain text or encrypted form.

A cryptographic system can execute various cryptographic algorithms that alternatively encrypt or decrypt data. Encrypting data converts it to an unintelligible form called a cipher. Decrypting the cipher converts the data back to its original form called plain text. In general, decrypting the cipher involves an inverse of the algorithm used to encrypt the data. As examples, a cryptographic system can implement the data encryption standard (DES), the triple data encryption algorithm (TDEA), and/or the advanced encryption standard (AES). DES includes multiple mathematical algorithms for encrypting and decrypting binary coded information based on a binary number called a key. TDEA is a compound operation of DES encryption and decryption operations. A TDEA key consists of three DES keys. Data can be recovered from a cipher only by using exactly the same key used to encipher it.

Figure 2:
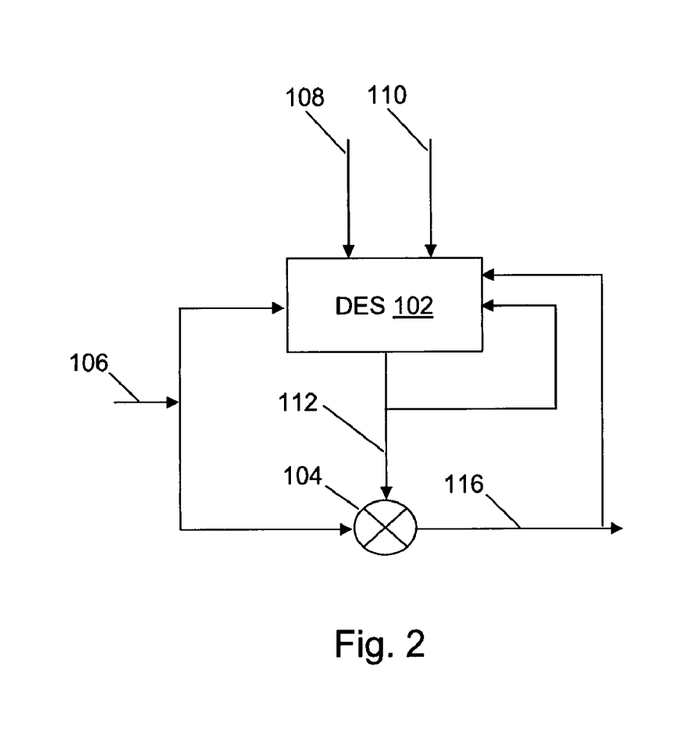
FIG. 2 is a block diagram of different modes using the data encryption standard cryptographic algorithm.

With reference to FIG. 2, several modes employing DES are shown. A DES algorithm 102 is designed to encrypt and decrypt input data 106 under control of a key 108. Using the DES algorithm 102, input data 106 to be encrypted is subjected to an initial permutation, then to a complex key-dependent computation, and finally to a permutation which is the inverse of the initial permutation. The key-dependent computation includes a cipher function and a key schedule function. Four modes of operation using the DES algorithm 102 have been standardized: the electronic codebook (ECB) mode, the cipher block chaining (CBC) mode, the cipher feedback (CFB) mode, and the output feedback (OFB) mode. ECB mode is a direct application of the DES algorithm used to encrypt and decrypt data. ECB mode utilizes the key 108 and the input data 106 to form cipher output 112. ECB mode does not use feedback. Using the ECB mode, the resulting cipher output 112 is used as the cipher text 116.

CBC mode is an enhanced mode of ECB mode that chains together blocks of cipher output. Using the CBC mode, input data 106 to be encrypted is divided into input blocks. The first input block is XOR'ed with an initialization vector (IV) 110 to form a DES input block. The IV defines the starting point of an encryption process within a cryptographic algorithm. The IV may be random. Because the XOR operator is its own binary inverse, the same IV is used for both the encryption of plain text and the decryption of cipher text. The DES input block is processed by the DES algorithm 102, and the resulting cipher output 112 is used as the cipher text 116. Cipher output 112 is fedback to the DES algorithm 102 and XOR'ed with the second input block to produce a second DES input block. The second DES input block is used to produce a second cipher output 112. As a result, the CBC mode continues to "chain" successive cipher output 112 with the next input block until the last input block in the message is encrypted.

Using the CFB mode, input data 106 to be encrypted is divided into input blocks. In both the CFB encrypt and decrypt operations, IV 110 is used. The IV 110 is placed in the least significant bits of the first input block with the unused bits set to "0" forming a first DES input block. The first DES input block is processed by the DES algorithm 102 to form a first cipher output 112. Cipher text 116 is formed by mixing the first input block with the most significant K bits of the cipher output 112 using a stream mixer 104. Stream mixer 104 may be an XOR gate. The cipher text 116 is fedback to the DES algorithm 102 and processed by the DES algorithm 102 to form a next cipher output 112. The next cipher output 112 is mixed with the second input block to produce the next cipher text 116. The CFB mode continues the process until the last input block in the message is encrypted. As a result, the CFB mode uses previously generated cipher text 116 as input to the DES algorithm 102 to generate cipher output 112 that is combined with successive input blocks to produce the cipher text 116.

Using the OFB mode, input data 106 to be encrypted is divided into input blocks. In both the OFB encrypt and decrypt operations, IV 110 is used. The IV 110 is placed in the least significant bits of the first input block with the unused bits set to "0" forming a first DES input block. The first DES input block is processed by the DES algorithm 102 to form a first cipher output 112. Cipher text 116 is formed by mixing the first input block with the most significant K bits of the cipher output 112 using the stream mixer 104. The cipher output 112 is fedback to the DES algorithm 102 and processed by the DES algorithm 102 to form a next cipher output 112. The next cipher output 112 is mixed with the second input block to produce the next cipher text 116. The OFB mode continues the process until the last input block in the message is encrypted. As a result, the OFB mode uses previously generated cipher output 112 as input to the DES algorithm 102 to generate a next cipher output 112 that is combined with successive input blocks to produce the cipher text 116.

AES is a symmetric block cipher that can process data blocks of 128 bits, using cipher keys with lengths of 128, 192, and 256 bits. For the AES algorithm, the number of rounds to be performed during the execution of the algorithm is dependent on the key size. The number of rounds is 10 for a key length of 128 bits, 12 for a key length of 192 bits, 14 for a key length of 256 bits. Internally, the AES algorithm's operations are performed on a two-dimensional array of bytes called the "state". At the start of the encryption/decryption, the input data is copied into the state. The encryption/decryption operations are conducted on this state, after which its final value is copied to the cipher output. Using the AES algorithm, the resulting cipher output is used as the cipher text. The AES algorithm takes the key and performs a key expansion routine to generate a key schedule that consists of a one-dimensional array of words that may include a variable number of bytes. For example, an AES algorithm may use a four-bytes per word architecture and 16-bytes for each round key. The function executed each round is parameterized using the key schedule.

Thus, cryptographic algorithms generally use one or more cryptographic datum as an input in addition to the input data. The cryptographic datum may be one or more of a key, a key schedule, an IV, cipher text, cipher output, etc. Additionally, as in some DES modes, plain text is mixed with the cipher output to form cipher text. Mixing generally uses an XOR gate.

Figure 3:
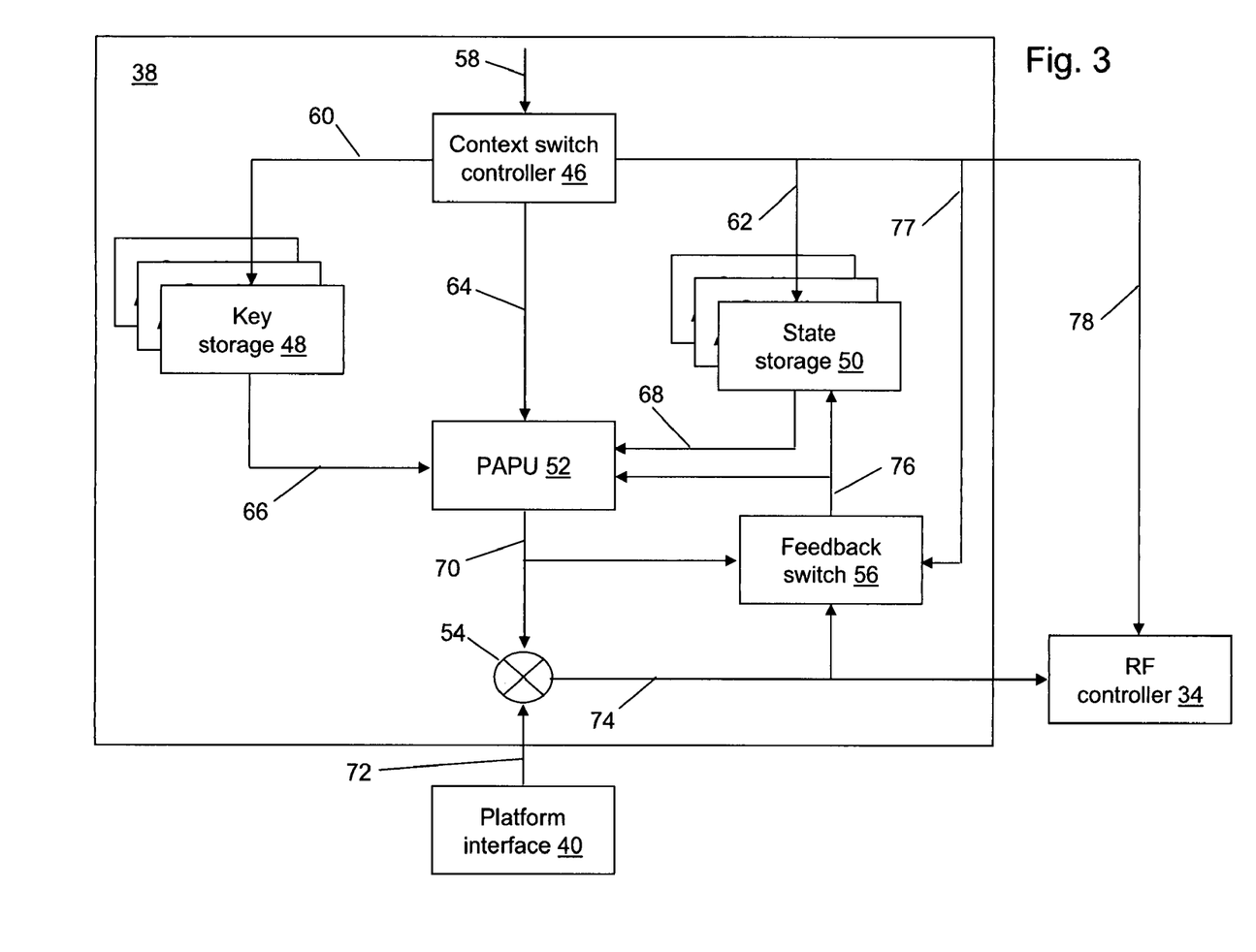
FIG. 3 is a block diagram of components of the cryptographic system in accordance with an exemplary embodiment.

With reference to FIG. 3, an exemplary embodiment of cryptographic system 38 is shown. Cryptographic system 38 can execute any number of cryptographic algorithms known to those skilled in the art both now and in the future. A context for processing data within the cryptographic system 38 may change. For example, multiple channels in a multi-channel radio may receive messages. Additionally, the classification level of data processed through a channel may change requiring use of a different cryptographic algorithm. Data processed through a channel also may change in form, for example, from text to voice. Any of these events may cause a context change for processing of information within cryptographic system 38. As a result, RF controller 34 controls the switching of cryptographic system 38 between contexts that include the user channel processed, the type of data processed at the user channel, and the classification level of the processed data. RF controller 34 sends a context switch command to cryptographic system 38 requesting a change in context. In an exemplary embodiment, cipher text 74 formed using cryptographic system 38 is received by RF controller 34 for routing to the one of the modems 26a-26d based on a channel selection 78. As known to those skilled in the art, a decryption algorithm generally is the inverse of the encryption algorithm. As a result, operations of cryptographic system 38 can be reversed using appropriate switches, for example, to send plain text output to platform interface 40.

Cryptographic system 38 is a state machine. In general, a state machine is a device that stores the status of something and that causes a change in status and/or output upon receipt of a command. A state machine consists of a set of states (including the initial state), a set of input events, a set of output events, and a state transition function. The state transition function takes the current state and an input event and returns a new set of output events and the next state.

Cryptographic system 38 includes, but is not limited to, context switch controller 46, key storage 48, state storage 50, PAPU 52, text/cipher stream mixer 54, and feedback switch 56. Context switch controller 46 switches the state of PAPU 52 to process data from one user channel 30a-30d to another channel 30a-30d without leaking data between the channels. A context is switched, for example, at the end of a first message to begin processing a second message possibly from another user channel or from the same user channel, and possibly, at a different classification level. Context switch controller 46 receives context input 58 that may include multiple input types. For example, context switch controller 46 may receive user channel data, a context switch control, and/ or an initialize control. The context switch control indicates when a context switch occurs and which user channel 30a-30d provides the new context.

Key storage 48 stores at least one plaintext or encrypted cryptographic key or key schedule for each context that can be transferred, upon command, into PAPU 52 for cryptographic processing. Key storage 48 receives a key or key schedule input 60 that includes a key selection identifying the key or key schedule to send to the PAPU 52 for cryptographic processing of the channel data. Key schedules are defined based on the encryption algorithm and can be very simple (bit rearrangement) or very complex (AES key expansion uses mathematical functions). Access to only the key/key schedule 60 for the current channel is allowed. The key/key schedule data is stored by the channel during or after initialization.

State storage 50 stores state information for each context that can be transferred, upon command, into PAPU 52 for cryptographic processing. State storage 50 receives state input 62 that includes a state selection identifying the state information to send to the PAPU 52 for cryptographic processing of the channel data. For example, if AES is the cryptographic algorithm used to support cryptographic processing of the context, the state may be the previous value of the cipher. State storage is any memory technology as known to those skilled in the art both now and in the future. Example memory technologies include, but are not limited to, random access memory, read only memory, flash memory, etc.

PAPU 52 executes a cryptographic function selected based on a control input from the context switch controller. The control input may specify selection of the cryptographic algorithm for execution. The cryptographic algorithm for execution may be selected based on, for example, the component transmitting the data, the type of data received, and/or the classification level assigned. PAPU 52 receives context input 64 from context switch controller 46 that includes the control input identifying the cryptographic function and channel data for processing. PAPU 52 receives key input 66 from key storage 48. Key input 66 includes key data for only one context to maintain MLS between channels. PAPU 52 receives state input 68 from state storage 50. State input 68 includes state data for only one context to maintain MLS between channels. Through execution of the identified cryptographic function using the key input 66, the state input 68, and the channel data, PAPU 52 forms cipher output 70. Depending on the cryptographic function, the state input 68 may include the IV.

In an exemplary embodiment, PAPU 52 contains processing elements with storage capability. These storage elements, for example, can be in the form of RAM or discrete hardware register elements. As discussed above, some cryptographic algorithms use state information from the previous cycle to compute the next output data. These storage elements can be used to store the state information until a context switch occurs. When a context switch occurs, the state information is stored to state storage 50 from which it is received when processing of the channel resumes after another context switch. State storage 50 is external to PAPU 52. To maximize the throughput of the cryptographic system 38, storage to state storage 50 only occurs during a context switch. When a context switch occurs, the cryptographic state is retrieved during, initialization to resume processing of the context. The amount of time needed to store/restore the state of the PAPU is dependant on the amount of state an algorithm uses, how it's organized during processing, and any additional work that is done to preserve the state. An AES algorithm, for example, has no algorithm state information, thus, the state of the PAPU is totally defined by the algorithms output/input relationship. Some legacy algorithms need time to pack the data into words for storage or to unpack and place the data in the architecture to load a previous state. Thus, a context switch may take anywhere from no time (doesn't delay the system) to 50-100 clock cycles. Thus, use of state storage 50 reduces the storage requirements for PAPU 52 while providing MLS between channels and continuing to provide a rapid response.

In an exemplary embodiment, text/cipher stream mixer 54 performs an XOR function that combines plain text 72 with the cipher output 70, or vice versa, for example, to implement a CFB mode algorithm producing cipher text 74.

In an exemplary embodiment, feedback switch 56 routes feedback information 76 into state storage 50. The state feedback 76 can be cipher output 70 or cipher text 74 depending on the cryptographic algorithm executed and the value of a status input 77 received from the context switch controller 46. The status input indicates a context switch. For example, if there is no context switch, the state feedback 76 is sent to PAPU 52. If there is a context switch, the status input 77 changes to a different value, and the state feedback 76 is sent to state storage 50.

Figure 4:
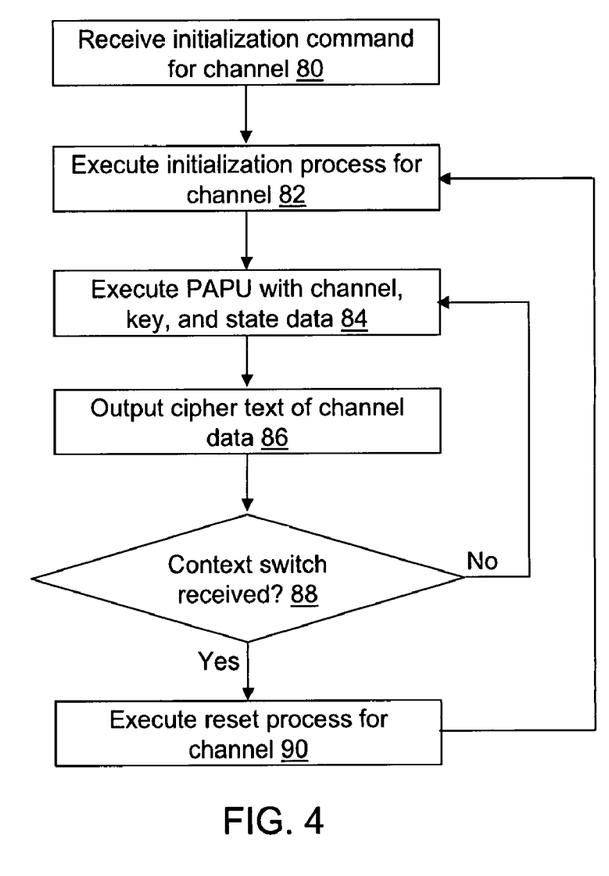
FIG. 4 is a flow diagram illustrating exemplary states of the cryptographic system of FIG. 3 in accordance with an exemplary embodiment.

With reference to FIG. 4, exemplary operations of cryptographic system 38 are described. When a context change occurs, the cryptographic system 38 receives a request to change. To enforce MLS, the cryptographic system 38 sequences through a rigid sequence of processing states to change the context while maintaining separation between data flows. In an operation 80, cryptographic system 38 receives an initialization command from RF controller 34 to initialize to a new context. In an operation 82, cryptographic system 38 executes an initialization process for processing communication information, for example, received from one of the user channels 30a-30d. As part of the initialization process, any initialization of the cryptographic algorithm is performed, and the context selection is identified. In an operation 84, PAPU 52 is executed using context data, a key schedule associated with the context, and state data associated with the context. In an operation 86, cipher text is output from cryptographic system 38. In an operation 88, receipt of a context switch is determined. As known to those skilled in the art, operation 88 may be continuously evaluated to determine when a context switch is received. If a context switch is not received, processing of the channel continues in operation 84. If a context switch is received, a reset process for cryptographic system 38 is performed. During the reset process, the feedback switch 56 is switched to route the state information for storage in state storage 50. Processing continues at operation 82 for a new context.

The foregoing description of exemplary embodiments of the invention have been presented for purposes of illustration and of description. For example, the description of the DES modes and the AES algorithm are for purposes of illustration and not of limitation. Any cryptographic algorithm can be implemented as part of the cryptographic system 38. The foregoing description is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A cryptographic system, the cryptographic system implementing cryptographic functions designed to protect data, the cryptographic system comprising:
a memory, the memory storing a first cryptographic datum;
a processing unit, the processing unit including instructions to;
(a) execute a cryptographic algorithm using a second cryptographic datum to form output data;
(b) determine if a context switch command is received, the context switch command including a request to change a processing state of the processing unit;
(c) receive the first cryptographic datum from the memory if the context switch command is received;
(d) send the second cryptographic datum to the memory if the context switch command is received before replacing the second cryptographic datum with the first cryptographic datum;
(e) replace the second cryptographic datum with the first cryptographic datum if the context switch command is received; and
(f) repeat (a)-(e); and
an RF controller configured to receive communications from a plurality of communications channels and to generate the context switch command based on the communications of the plurality of communications channels, the RF controller is further configured to send the context switch command to the processing unit.

2. The cryptographic system of claim 1, wherein the processing unit is programmable.

3. The cryptographic system of claim 1, wherein the first cryptographic datum includes at least one of a key, a key schedule, an initialization vector, cipher output, cipher text, and plain text.

4. The cryptographic system of claim 1, wherein the cryptographic algorithm is selected from a group consisting of a data encryption standard algorithm, a triple data encryption algorithm, and an advanced encryption standard algorithm.

5. The cryptographic system of claim 4, wherein the data encryption standard algorithm includes a mode, and wherein the mode is selected from the group consisting of an electronic codebook mode, a cipher block chaining mode, a cipher feedback mode, and an output feedback mode.

6. The cryptographic system of claim 1, wherein the processing state is selected from a group consisting of an initialize state, an execute state, and a reset state.

7. The cryptographic system of claim 1, wherein the output data is selected from a group consisting of cipher output, cipher text, and plain text.

8. The cryptographic system of claim 1, further comprising a feedback switch, the feedback switch being configured to send the output data to the cryptographic algorithm, the output data used as an input for the next execution of the cryptographic algorithm.

9. The cryptographic system of claim 1, further comprising a feedback switch, the feedback switch being configured to send the output data to the memory.

10. The cryptographic system of claim 1, further comprising a feedback switch, wherein the feedback switch being configured to send the output data to the memory if the processing state is a first value, and wherein the feedback switch being configured to send the output data to the cryptographic algorithm if the processing state is a second value.

11. The cryptographic system of claim 1, further comprising a stream mixer, the stream mixer being configured to mix the output data with the input data to form mixed output data wherein, the input data is received from a component.

12. The cryptographic system of claim 11, wherein the mixed output data is selected from a group consisting of cipher output, cipher text, and plain text.

13. The cryptographic system of claim 11, wherein the component is selected from a group consisting of a modem, a platform interface, a telecommunications application, and a computer application.

14. The cryptographic system of claim 1, further comprising receiving input data from a component before executing the cryptographic algorithm, wherein executing the cryptographic algorithm further uses the received input data to form the output data.

15. The cryptographic system of claim 14, wherein the processing unit includes a plurality of cryptographic algorithms, and wherein the cryptographic algorithm executed is selected based on the context switch command.

16. The cryptographic system of claim 15, wherein the component is selected from a group consisting of a modem, a platform interface, a telecommunications application, and a computer application.

17. A device, the device comprising:
a component forming input data;
a cryptographic system, the cryptographic system receiving the formed input data from the component, the cryptographic system comprising
a memory, the memory storing a first cryptographic datum;
a processing unit, the processing unit
(a) executing a cryptographic algorithm using a second cryptographic datum and the received input data to form output data;
(b) determining if a context switch command is received, the context switch command including a request to change a processing state of the processing unit;
(c) receiving the first cryptographic datum from the memory if the context switch command is received;
(d) sending the second cryptographic datum to the memory if the context switch command is received before replacing the second cryptographic datum with the first cryptographic datum;
(e) replacing the second cryptographic datum with the first cryptographic datum if the context switch command is received; and
(f) repeating (a)-(e); and
a context switch controller, the context switch controller sending the context switch command to the processing unit; and
an RF controller configured to receive communications from a plurality of communications channels, the RF controller identifying an event based on the received communications, the RF controller further configured to determine that the event caused a context change for the cryptographic system, the RF controller further configured to send a command to the context switch controller including a context switch.

18. The device of claim 17, wherein the component is selected from the group consisting of a modem, a platform interface, a telecommunications application, and a computer application.

19. A method of implementing cryptographic functions designed to protect data, the method comprising:

provniding a processing unit and an RF controller configured to receive communications from a plurality of communications channels;

using the RF controller to process the communications to determine to send a context switch command to the processing unit;

executing a cryptographic algorithm at the processing unit using a second cryptographic datum and input data to form output data, the input data received from a component;

determining if the context switch command is received from the RF controller, the context switch command including a request to change a processing state of the cryptographic algorithm;

receiving a first cryptographic datum from a memory if the context switch command is received;

(d) sending the second cryptographic datum to the memory if the context switch command is received before replacing the second cryptographic datum with the first cryptographic datum; and replacing the second cryptographic datum with the first cryptographic datum if the context switch command is received.

* * * * *